United States Patent [19]

Kassai

[11] Patent Number: 4,817,982
[45] Date of Patent: Apr. 4, 1989

[54] FOLDABLE BABY CARRIAGE WITH BASKET

[75] Inventor: Kenzou Kassai, Osaka, Japan

[73] Assignee: Aprica Kassai Kabushikikaisha, Osaka, Japan

[21] Appl. No.: 124,830

[22] Filed: Nov. 24, 1987

[30] Foreign Application Priority Data

Nov. 26, 1986 [JP] Japan ................................ 61-282780

[51] Int. Cl.⁴ ............................ B62B 7/06; B62B 9/26
[52] U.S. Cl. ..................................... 280/644; 280/650;
280/658; 280/47.38; 224/275; 297/189
[58] Field of Search ............... 280/642, 644, 647, 649,
280/650, 33.99 H, 47.38, 47.35, 657, 658, 47.4;
224/275; 297/191, 188, 189

[56] References Cited

U.S. PATENT DOCUMENTS

| Re. 31,760 | 12/1984 | Kassai | 280/644 |
|---|---|---|---|
| 1,708,906 | 4/1929 | Sparks et al. | 280/47.35 |
| 2,174,268 | 9/1939 | Kroll et al. | 280/649 |
| 2,505,323 | 4/1950 | Geiger | 280/47.35 |
| 2,911,130 | 11/1959 | Kitazono | 280/47.35 |
| 4,317,581 | 3/1982 | Kassai | 280/644 |
| 4,697,823 | 10/1987 | Kassai | 280/650 X |

FOREIGN PATENT DOCUMENTS 56-57574   5/1981   Japan .
56-95966   7/1981   Japan .

Primary Examiner—Charles A. Marmor
Assistant Examiner—Tamara L. Finlay
Attorney, Agent, or Firm—W. G. Fasse; D. H. Kane, Jr.

[57] ABSTRACT

A foldable baby carriage comprises a basket and an operating rod. The basket has a rotary member turnably attached to the foldable baby carriage body, an upper frame attached to the rotary member and extending long toward the rear, and a storage bag suspended from the upper frame. The operating rod connects a portion of the rotary member remote from the axis of rotation to a member which constitutes the baby carriage body. The length and attachment position of the operating rod is selected so that in the folded state of the baby carriage with the rotary member turned following the folding movement of the baby carriage body, the upper frame of the basket is positioned extending substantially vertically.

10 Claims, 10 Drawing Sheets

FIG.16
FIG.17
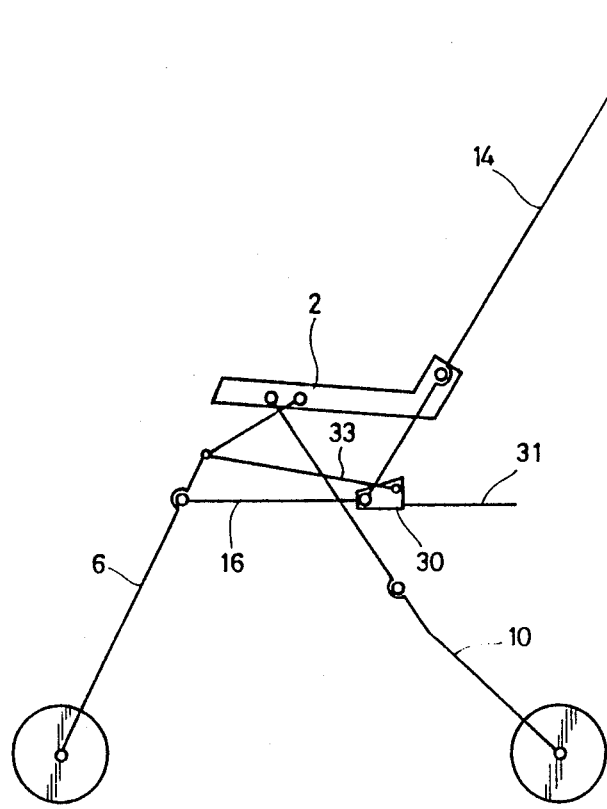
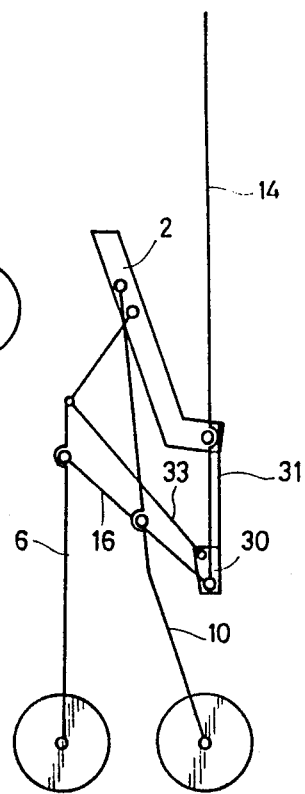

FIG.18
FIG.19
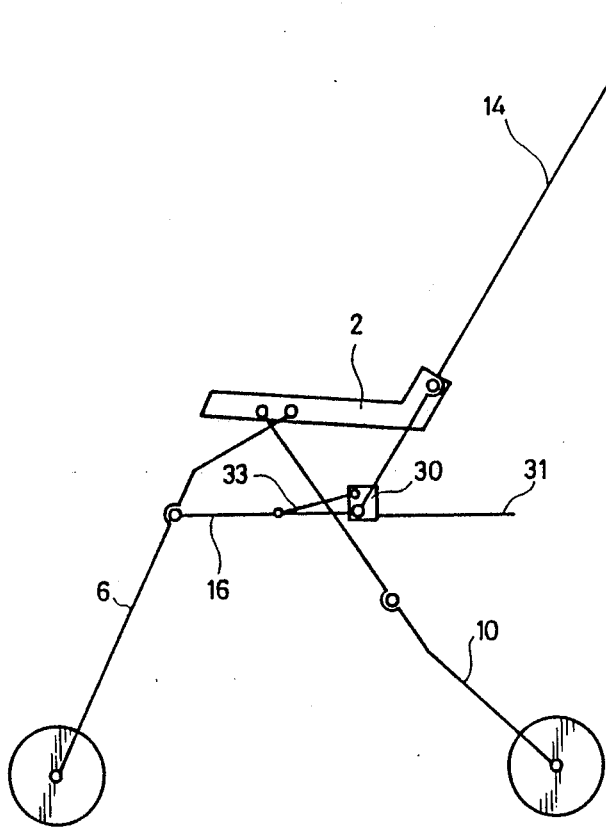
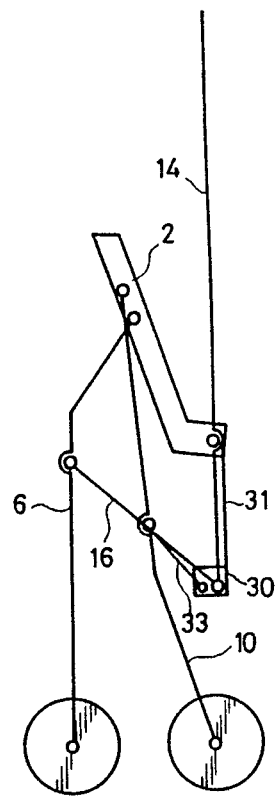

FOLDABLE BABY CARRIAGE WITH BASKET

BACKGROUND OF THE INVENTION

1. Field of the Invention

This invention relates to a foldable baby carriage and particularly to a foldable baby carriage with a basket.

If a baby carriage is provided with a basket, this is very convenient for shopping. For this reason, there have been proposed a variety of baby carriages having a basket.

2. Description of the Prior Art

In the case of a foldable baby carriage, it is desired that a basket attached thereto be folded following the folding movement of the baby carriage body and that the folded basket be received in the space occupied by the baby carriage body or not be protruding out of said occupied space.

Accordingly, an object of the invention is to provide a baby carriage with a basket which meets the desire described above.

SUMMARY OF THE INVENTION

A foldable baby carriage according to the invention has a basket and an operating rod. The basket comprises a rotary member turnably attached to the foldable baby carriage body, an upper frame attached to said rotary member and extending rearwardly, and a storage bag suspended from said upper frame. The operating rod connects the portion of said rotary member remote from the center of rotation to the baby carriage body.

The length and attachment position of the operating rod are selected so that when the baby carriage is in the folded state established as the rotary member is turned following the folding movement of the baby carriage, the upper frame is positioned to extend in a substantially vertical direction.

When the baby carriage is in the opened state, since the upper frame extends rearwardly, the storage bag forms a large opening in the upper portion thereof. Therefore, purchased articles can be easily taken in and out. Further, when the baby carriage is operated for folding, the rotary member is automatically rotated by the action of the operating rod, and in the folded state of the baby carriage, the upper frame is positioned substantially vertically extended. Therefore, there is no special operation needed for folding the basket. Further, in the folded state of the baby carriage, the upper frame extends substantially vertically. Hence, it does not protrude out of the occupied space so much.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 16 is a diagrammatic view showing another embodiment of the invention;

FIG. 17 is a diagrammatic view showing the folded state of a baby carriage shown in FIG. 16;

FIG. 18 is a diagrammatic view showing a further embodiment of the invention;

FIG. 19 is a diagrammatic view showing the folded state of a baby carriage shown in FIG. 18;

DESCRIPTION OF THE PREFERRED EMBODIMENTS

Figure 1:
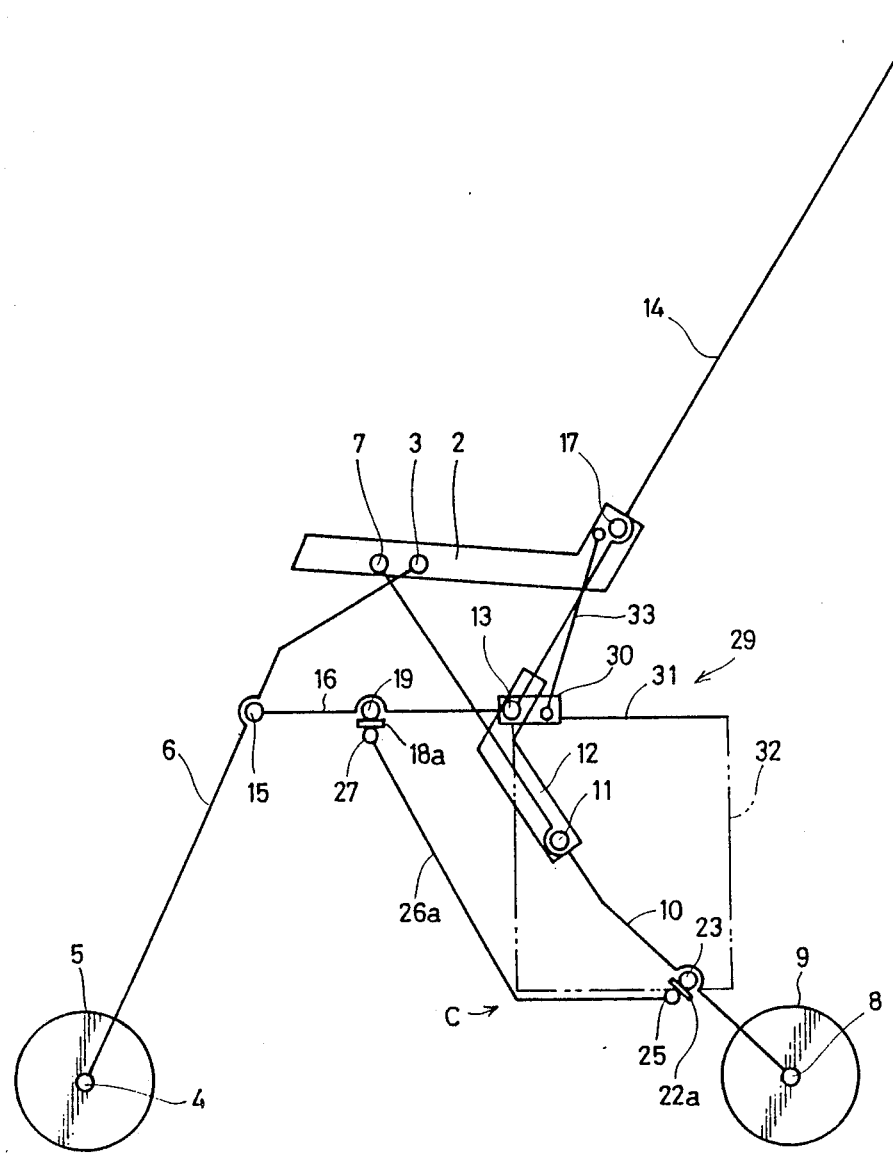
FIG. 1 is a diagrammatic view of an embodiment of the invention in its unfolded or opened state.
Figure 2:
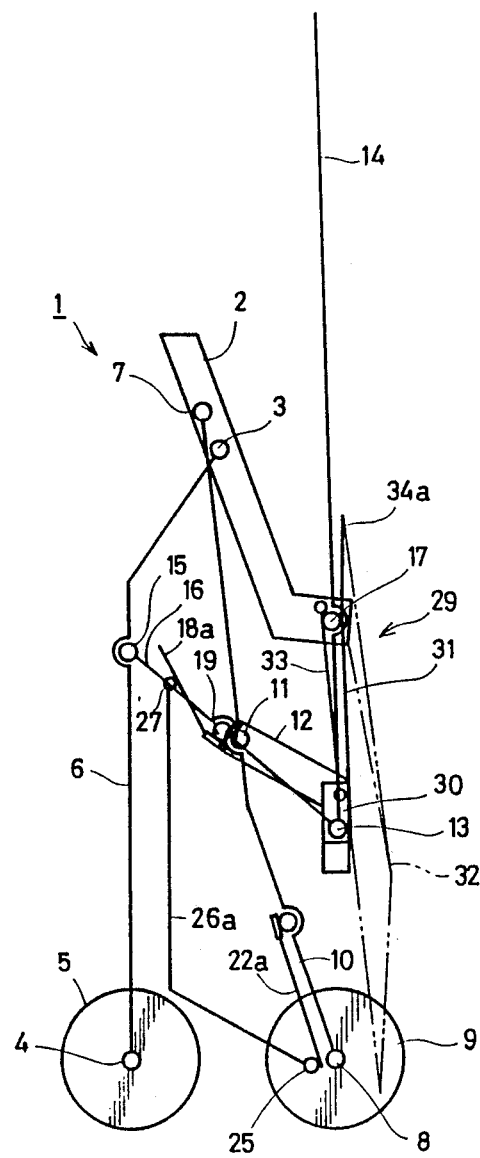
FIG. 2 is a diagrammatic view showing the folded state of a baby carriage shown in FIG. 1.

FIGS. 1 and 2 are views diagrammatically showing an embodiment of the invention. An illustrated baby carriage 1 is constructed so that its front to back dimension is reduced as it is folded out of the open state shown in FIG. 1 to assume the folded state shown in FIG. 2. The basic construction of such a baby carriage body is disclosed in Japanese Patent Application Laying-Open No. 57574/1981 and Japanese Utility Model Application Laying-Open No. 95966/1981.

First, referring to FIG. 1, the basic skeleton of the baby carriage 1 will be described. The illustrated baby carriage 1 comprises horizontally extending handrails 2, front legs 6 turnably connected at their upper ends to the handrails 2 through shafts 3, rotatably support. Front wheels 5 are rotatably secured to the lower ends of the front legs 6 by axles 4. Furthermore, rear legs 10 turnably connected at their upper ends to the handrails 2 through shafts 7. Rear wheels 9 are secured to the lower ends of the rear legs 10 by shafts 8. Push rod support angle members 12 are turnably attached to substantially middle portions of the rear legs 10 through shafts 11. Push rods 14 are turnably connected at their lower ends to the push rod support angle members 12 through a shaft 13. Seat support rods 16 are turnably connected at their respective front ends to the front legs 6 through shafts 15 and at their respective rear ends to the push rod support angle members 12 through the shafts 13. The handrails 2, front legs 6, rear legs 10, push rods 14 and seat support rods 16 are each provided as a pair, whereby the two members of each pair are arranged on opposite lateral sides of the baby carriage.

In the opened state of the baby carriage 1 as shown in FIG. 1, turning movement of the push rod support angle members 12 is inhibited by conventional means, thereby locking the opened state of the baby carriage. When it is desired to fold the baby carriage, the locked state of the push rod support angle members 12 is canceled and then the push rod support angle members 12 are operated so that they are turned clockwise as viewed in FIG. 1. In response thereto, the front and rear legs 6 and 10 are moved toward each other, until the folded state shown in FIG. 2 is obtained. As shown in FIG. 2, in the folded state of the baby carriage, the front and rear wheels 5 and 9 are at the same level, thereby enabling the baby carriage 1 to stand by itself. The detailed construction of many of the elements shown in FIGS. 1 and 2 is shown and described more clearly with reference to FIGS. 3 to 12 below.

Figure 3:
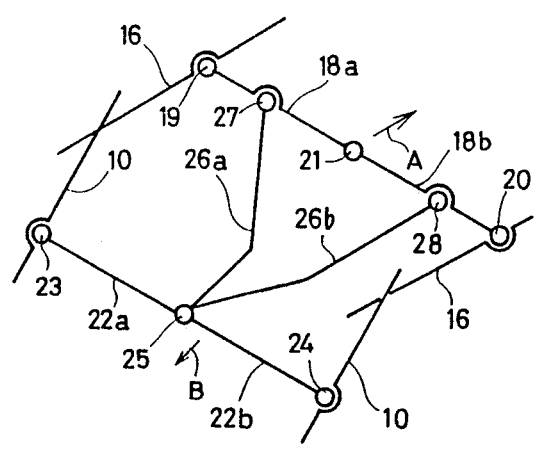
FIG. 3 is a diagrammatic view showing the construction of parts associated with a seat support rod 16 and a rear leg 10 shown in FIG. 1.

FIG. 3 is a view diagrammatically showing the construction of parts associated with the pair of seat support rods 16 and the pair of rear legs 10. As shown, a central connecting member 18a, 18b is connected between the pair of seat support rods 16. The central connecting member 18a, 18b is turnably connected at its left-hand end through a shaft 19 to the seat support rod 16 positioned on the left-hand surface of the baby carriage and at its right-hand end through a shaft 20 to the seat support rod 16 positioned on the right-hand surface of the baby carriage. Further, the central connecting member 18a, 18b comprises two members 18a and 18b which are hinged together through a shaft 21. In this manner, the central connecting member 18a, 18b is foldable at its middle in the direction of arrow A.

A rear log connecting member 22a, 22b is connected between the pair of rear legs 10. The rear leg connecting member 22a, 22b is turnably connected at its left-hand end through a shaft 23 to the rear leg 10 positioned on the left-hand surface of the baby carriage and at its right-hand end through a shaft 24 to the rear leg 10 positioned on the right-hand surface of the baby carriage. Further, as shown, the rear leg connecting member 22a, 22b comprises two members 22a and 22b which are hinged together through a shaft 25. In this manner, the rear leg connecting member 22a, 22b is foldable at its middle in the direction of arrow B.

As shown, prop rods 26a and 26b are connected between the central connecting member 18a, 18b and the rear leg connecting member 22a, 22b. One prop rod 26a is turnably connected at its front end through a shaft 27 to the left-hand central connecting member 18a positioned on the left-hand side, and at its rear end through a shaft 25 to the middle portion of the rear leg connecting member 22a, 22b. The other prop member 26b is turnably connected at its front end through a shaft 28 to the right-hand central connecting member 18b positioned on the right-hand side, and at its rear end through a shaft 25 to the middle portion of the rear leg connecting member 22a, 22b.

Figure 4:
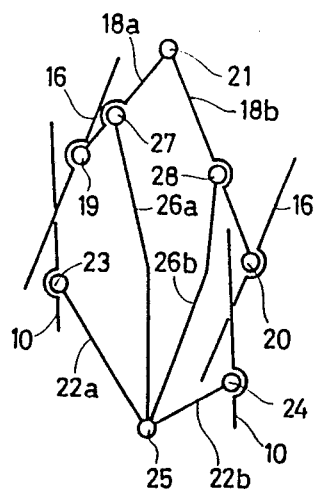
FIG. 4 is a diagrammatic view showing the folded state of the construction shown in FIG. 3.

As the baby carriage 1 is folded, the central connecting member 18a, 18b and the rear connecting member 22a, 22b move into their folded positions shown in FIG. 4. Therefore, by the action of the prop rods 26a and 26b, the central connecting member 18a, 18b is folded in the direction of arrow A, while the rear leg connecting member 22a, 22b is folded in the direction of arrow B.

As shown, the folding of the central connecting member 18a, 18b and rear leg connecting members 22a, 22b causes the members 10, 16 positioned on the left-hand surface of the baby carriage 1 to move toward the members 10, 16 positioned on the right-hand surface. Thus, the baby carriage shown in FIGS. 1 to 4 is reduced in its front to back dimension when it is folded.

As for a basket to be installed in a baby carriage, the greater the storage capacity, the better. However, it should be avoided to install in a baby carriage a basket having so great a storage capacity as to cause inconvenience in moving the baby carriage. With this taken into account, it is believed that a large space defined below the seat of a baby carriage is suitable for installing a basket having a great storage capacity. In the embodiment shown in FIGS. 1 and 2, to make effective use of large space defined below the seat of the baby carriage to install a basket having a large storage capacity, the shape of the prop rods 26a and 26b has been improved.

More particularly, in the baby carriage described in Japanese Patent Application Laying-Open No. 57574/1981 and Japanese Utility Model Application Laying-Open No. 95966/1981, the prop rods extend linearly from the respective point of connection with the central connecting rod to the respective point of connection with the rear leg connecting member. However, in the embodiment shown in FIGS. 1 and 2, the prop rods 26a and 26b have a bent shape. In FIG. 1, the bent portion is shown at C. The bent portion C of the prop rods 26a and 26b is positioned relatively forwardly of the rear leg connecting member 22a, 22b. The prop rod portion between the bent portion C and the point of connection to the rear leg connecting member 22a, 22b extends substantially horizontally.

By shaping the prop rods 26a and 26b as described above, there is defined a relatively large space between the prop rods 26a and 26b and the rear leg 10. A basket having a large storage capacity can be installed by utilizing this large space. In the illustrated embodiment, a basket 29 adapted to be folded in response to the folding movement of the baby carriage is installed by utilizing the space defined between the prop rods 26a and 26b and the rear leg 10.

Referring to FIG. 1, the basket 29 comprises a pair of rotary members 30 turnably attached to the push rod support angle members 12 through the shafts 13, a pair of upper frames 31 fixedly attached to said rotary members 30 and extending rearwardly, and a storage bag 32 suspended from said rotary members 30 and said upper frames 31. Further, to automatically fold the basket 29 as the baby carriage is folded, an operating rod 33 is connected between the rotary member 30 and the handrail 2.

When the folding operation of the baby carriage is started from the state shown in FIG. 1, the rotary member 30 is pulled by the operating rod 33 and is turned counterclockwise as viewed in the figure. With this turning movement of the rotary member 30, the upper frame 31 is turned toward the push rod 14, until the push rod 14 and the upper frame 31 are positioned close to each other, as shown in FIG. 2. In other words, the upper frame 31 is positioned extending substantially vertically. Since the storage bag 32 is made of a soft material, it assumes a flat form and hangs down in the folded state shown in FIG. 2.

Figure 5:
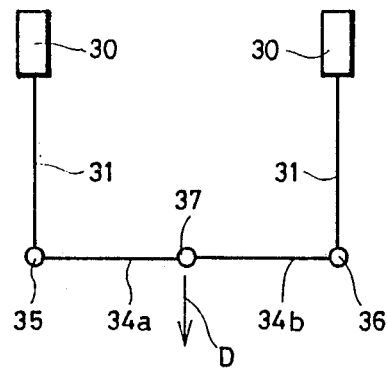
FIG. 5 is a diagrammatic view showing the construction of parts associated with the rotary member 30 and upper frame 31 of a basket 29 shown in FIG. 1.
Figure 6:
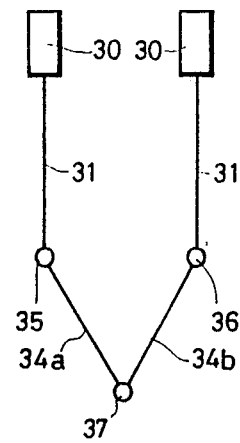
FIG. 6 is a diagrammatic view showing the folded state of the construction shown in FIG. 5.

FIGS. 5 and 6 are diagrammatic views showing the skeleton of the basket 29. First, referring to FIG. 5, an upper frame connecting member 34a, 34b is connected between the pair of upper frames 31. The upper connecting member 34a, 34b is turnably connected at its left-hand end through a shaft 35 to the upper frame 31 positioned on the left-hand side and at its right-hand end through a shaft 36 to the upper frame 31 positioned on the right-hand side. Further, the upper frame connecting member 34a, 34b comprises two members 34a and 34b which are hinged together through a shaft 37. In this manner, the upper frame connecting member 34a, 34b is foldable at its middle in the direction of arrow D. The purpose of making the skeleton construction of the basket 29 in the form shown, is to reduce the front to back dimension of the basket 29 to be reduced in the folded state. More particularly, as shown in FIG. 6, in the folded state of the basket 29, the upper frame connecting member 34a, 34b is folded at the middle, whereby the pair of upper frames 31 are moved toward each other.

As shown in FIG. 1, when the baby carriage is in the opened state, part of the basket 29 is positioned in the space defined between the prop rods 26a and 26b and the rear legs 10. Therefore, the storage capacity of the basket 29 can be made large while the rearward extension of the basket 29 is kept relatively short.

Figure 7:
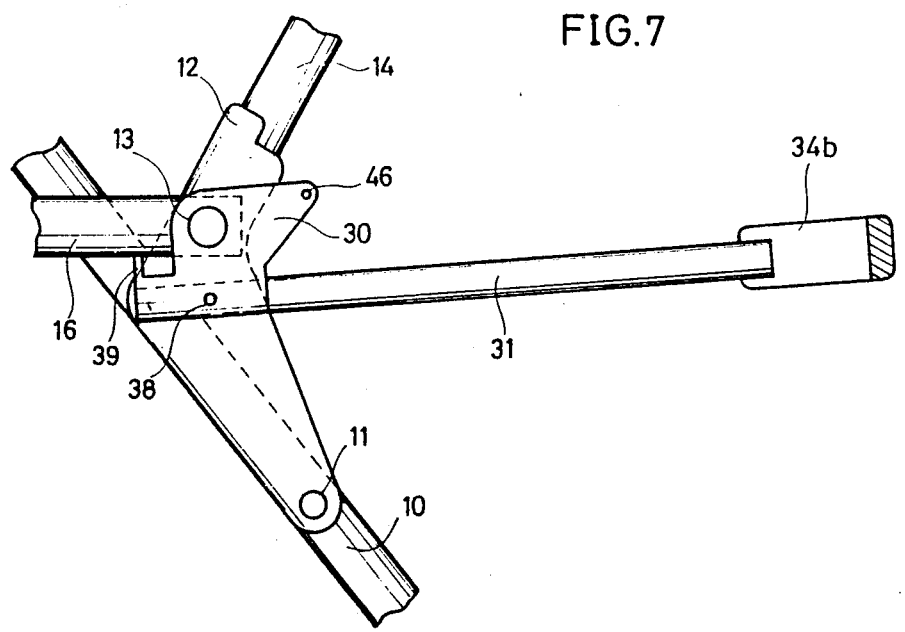
FIG. 7 is a view showing an actual construction of the rotary member 30 and upper frame 31.

FIG. 7 shows the construction of parts associated with the rotary member 30 positioned on the right-hand side of the baby carriage. As shown, the rotary member 30 is turnably attached to the push rod support angle member 12 by the shaft 13, and the upper frame 31 is fixedly attached to the rotary member 30 through a pin 38. The rotary member 30 has an upwardly projecting abutment portion 39. When the baby carriage 1 is in the opened state, the abutment portion 39 abuts against the seat support rod 16, thereby inhibiting the upper frame 31 from turning clockwise as viewed in the figure. Further, the attachment hole 46 of the rotary member 30 shown in FIG. 7 has an operating rod 33 attached thereto. The rod 33 is visible in FIG. 1, but not in FIG. 7.

Figure 8:
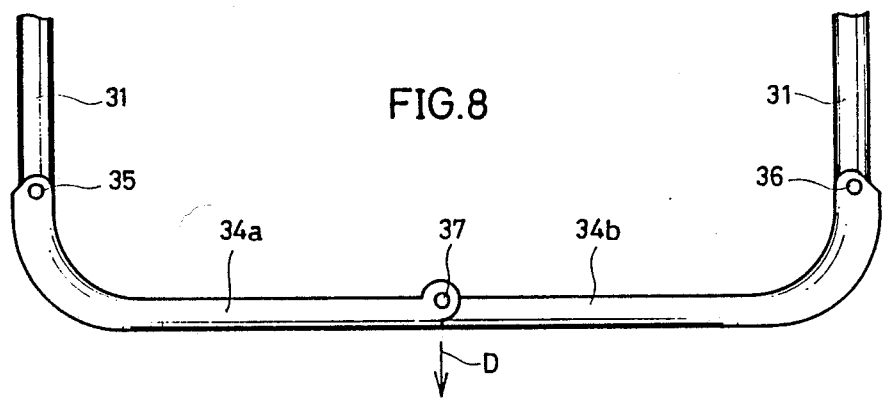
FIG. 8 is a view looking from above at the arrangement of FIG. 7 showing the upper frame 31 and upper frame connecting members 34a and 34b.
Figure 9:
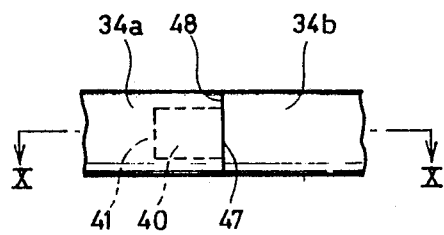
FIG. 9 is a view looking from behind at the central portions of the upper frame connecting members 34a and 34b shown in FIG. 8.
Figure 10:
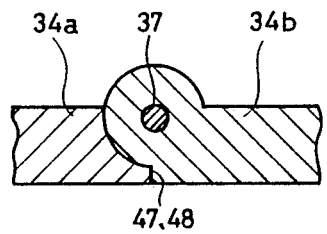
FIG. 10 is a sectional view taken along the line X—X in FIG. 9.

FIG. 8 is a view showing the pair of upper frames 31 and the upper frame connecting member 34a, 34b. FIG. 9 is a view looking from behind at the middle portion of the upper frame connecting member 34a, 34b, and FIG. 10 is a sectional view taken along the line X—X in FIG. 9.

Figure 11:
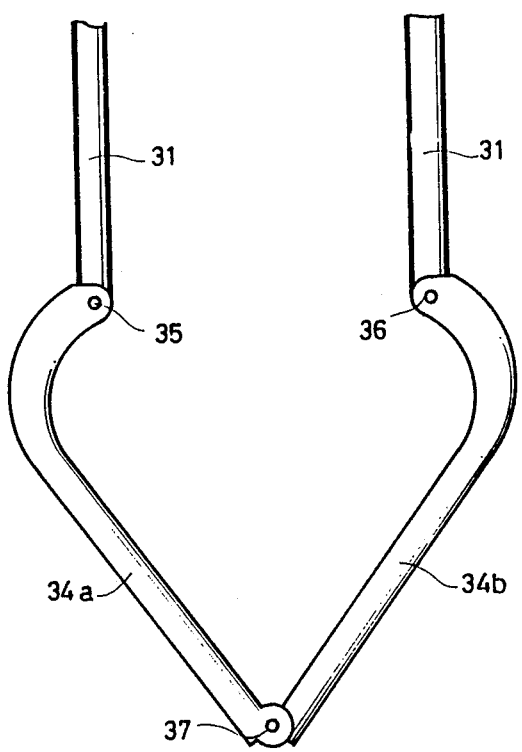
FIG. 11 is a view showing the folded state of the construction shown in FIG. 8.

As shown, the left-hand end of the upper frame connecting member 34b positioned on the right-hand side has an extension 40, while the right-hand end of the upper frame connecting member 34a positioned on the left-hand side has a reception recess 41 adapted to receive said extension 40. These members 40 and 41 are turnably connected together through a shaft 37. Further, the upper frame connecting member 34a positioned on the left-hand side and the upper frame connecting member 34b positioned on the right-hand side have abutment walls 47 and 48, respectively, adapted to abut against each other. The upper frame connecting member 34a, 34b can be folded in the direction of arrow D shown in FIG. 8, but its folding in the opposite direction is inhibited by the abutment walls 47 and 48 abutting against each other. FIG. 11 is a view showing the bent state of the upper frame connecting member 34a, 34b. When the upper frame connecting member 34a, 34b is folded at the middle as shown, the pair of upper frames 31 move toward each other, whereby the widthwise dimension of the basket 29 is reduced.

Figure 12:
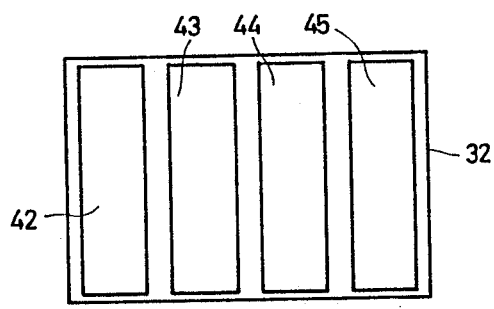
FIG. 12 is a diagrammatic view showing the bottom portion of the bag 32 of the basket 29.

FIG. 12 is a view diagrammatically showing the bottom surface of the storage bag 32 of the basket. The bottom surface of the storage bag 32 preferably has stiffener sheets 42, 43, 44 and 45 attached thereto to retain the proper shape of the bag. The stiffener sheets are in the form of four elongated sheets 42, 43, 44 and 45. The bottom surface is bendable at each region between adjacent stiffener sheets. The purpose of providing four separate stiffener sheets 42, 43, 44 and 45 is to make it possible to fold the bag 32 to reduce its front to back dimension.

Figure 13:
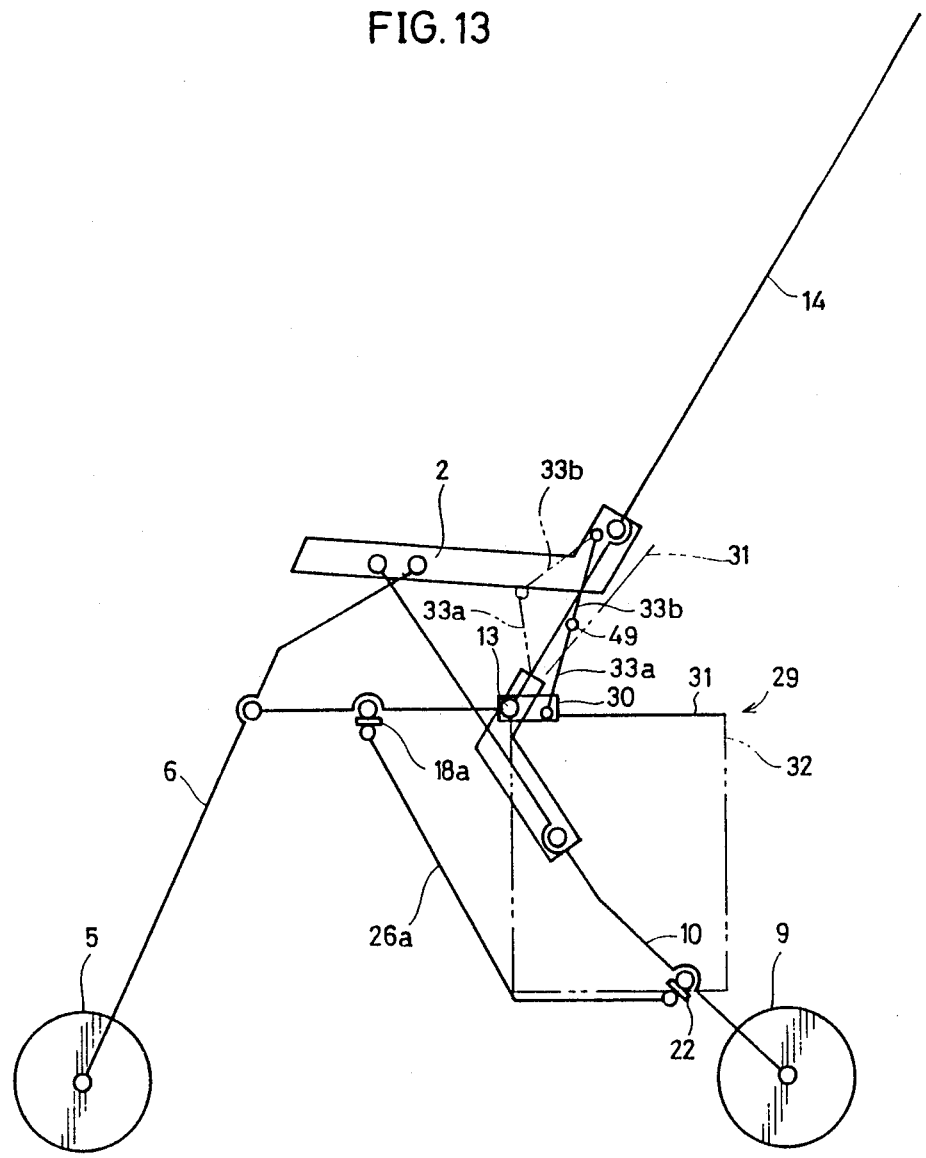
FIG. 13 is a diagrammatic view showing another embodiment of the invention.

FIG. 13 is a diagrammatic view showing another embodiment of the invention. The baby carriage shown in FIG. 13 is the same in construction, except for the operating rod, as the baby carriage shown in FIG. 1. Therefore, like elements are denoted by like reference numbers and a description thereof is omitted.

In the baby carriage shown in FIG. 13, the operating rod 33a, 33b comprises two members which are turnably connected together through a shaft 49. In other words, the operating rod 33a, 33b is foldable at the middle. Therefore, even in the opened state of the baby carriage as shown in FIG. 13, the basket 29 can be folded by turning the rotary members 30 and upper frames 31. In FIG. 13, the state of the basket 29 with its upper frame 31 positioned close to the push rod 14 is shown in phantom lines. The upper frame 31 is held fixed in the phantom line position by conventional means.

Figure 14:
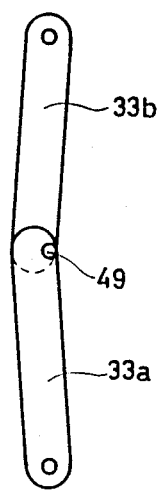
FIG. 14 is a view showing an actual construction of an operating rod 33a, 33b shown in FIG. 13.
Figure 15:
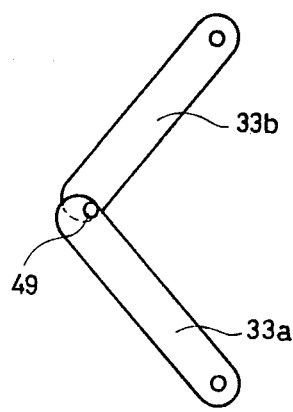
FIG. 15 is a view showing the bent or folded state of the operating rod 33a, 33b shown in FIG. 13.

FIG. 14 is a view showing a concrete form of the operating rod 33a, 33b shown in FIG. 13. If the operating rod portion 33b positioned above is linearly aligned with the operating rod portion 33a positioned below, this makes it rather difficult to fold them at the joint. For this reason, the shaft 49 which connects the upper operating rod portion 33b and the lower operating rod portion 33a, is positioned rearwardly offset, as shown in FIGS. 14 and 15. By so doing, the operating rod portions 33b and 33a are connected together in a somewhat folded state. Therefore, if the upper frame 31 of the basket is turned upward, the operating rods 33a, 33b are forwardly bent at the middle without any difficulty. The forwardly bent state of the operating rods 33a, 33b is shown in FIG. 15.

In the two embodiments described above, the operating rod 33 has been attached to connect the rotary member 30 and the handrail 2; however, the attachment position of the operating rod 33 can be changed as desired. In other words, the length and the attachment position of the operating rod are selected so that the rotary member 30 is turned in operative association with the folding movement of the baby carriage body so that in the folded state of the baby carriage, the upper frame 31 of the basket 29 is positioned extending substantially vertically.

In a baby carriage shown in FIGS. 16 and 17, the operating rod 33 connects the front leg 6 and the rotary member 30. Here, and in the following figures, parts having nothing to do with the description are omitted.

In the baby carriage shown in FIGS. 18 and 19, the operating rod 33 connects the seat support rod 16 and the rotary member 30.

Figure 20:
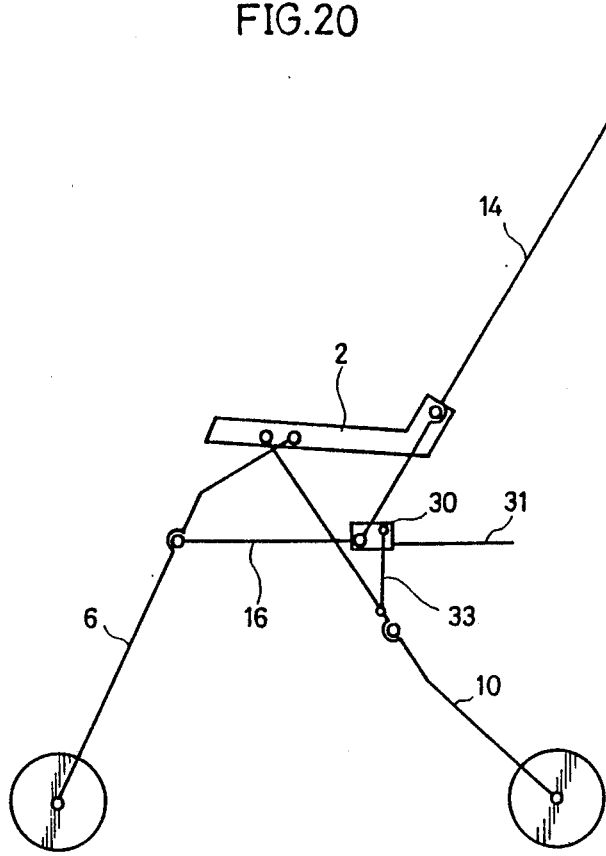
FIG. 20 is a diagrammatic view showing still another embodiment of the invention.
Figure 21:
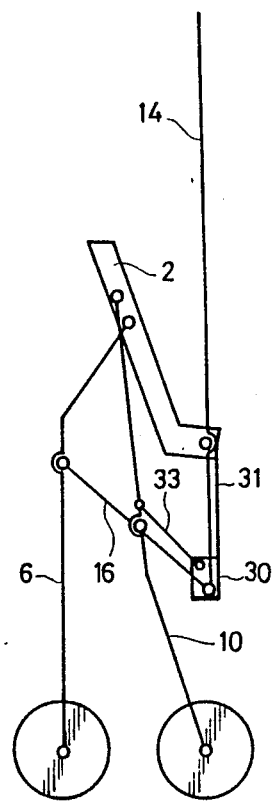
FIG. 21 is a diagrammatic view showing the folded state of a baby carriage shown in FIG. 20.

Further, in a baby carriage sown in FIGS. 20 and 21, the operating rod 33 connects the rear leg 10 and the rotary member 30.

The invention has been described as applied to a baby carriage which, in the folded state, is reduced in the widthwise dimension; however, the invention is equally applicable also to a baby carriage which, in the folded state, is not reduced in the widthwise dimension.

Although the present invention has been described and illustrated in detail, it is clearly understood that the same is by way of illustration and example only and is not to be taken by way of limitation, the scope of the present invention being limited only by the terms of the appended claims.

What is claimed is:

1. A foldable baby carriage, comprising foldable carriage frame means for supporting said carriage, foldable storage means for holding articles, means for suspending said foldable storage means comprising a rotary member turnably attached at an axis of rotation to said foldable carriage frame means, upper frame means (31) attached to said rotary member and extending rearwardly for suspending said storage means, and operating rod means (33) pivotally connected to a portion of said rotary member at a connecting position remote from said axis of rotation and to said frame means for manipulating said means for suspending said foldable storage means into an open state for a normal use of said foldable baby carriage and into a folded state by carrying out a folding movement in response to folding of the carriage frame means for reducing at least one dimension of said foldable baby carriage for storage, and wherein a length and said connecting position of said operating rod means are selected so that as a result of said folding movement of said carriage frame means, said rotary member rotates to such an extent that said upper frame means attached to said rotary member is positioned to extend substantially vertically in said folded state.

2. The foldable baby carriage of claim 1, further comprising hinge means (49) for said operating rod means to be foldable at substantially the middle of its length.

3. The foldable baby carriage of claim 1, wherein said foldable carriage frame means further comprise a pair of rearwardly extending handrails, a pair of front legs turnably connected at their upper ends to said handrails, a pair of front wheels rotatably supported at the lower ends of said front legs, a pair of rear legs turnably connected at their upper ends to said handrails, a pair of rear wheels rotatably supported at the lower ends of said rear legs, a pair of push rod support angle members turnably attached to substantially middle portions of said rear legs, a pair of push rods turnably connected at their lower ends to said push rod support angle members, and a pair of seat support rods turnably connected at their front ends to said front legs and at their rear ends to said push rod support angle members, whereby the arrangement of said push rod support angle members with said rear legs, said push rods, and said seat support rods provides that in said opened state of said baby carriage, said push rod support angle members are in a locked state in which said push rod support angle members are inhibited from turning easily from said locked state, whereby said opened state of said baby carriage is fixed, and said folding movement of said baby carriage is started by canceling said locked state of said push rod support angle members by forcibly turning said push rod support angle members past said inhibiting.

4. The foldable baby carriage of claim 3, further comprising pivot means for turnably connecting said rotary member to said push rod support angle member.

5. The foldable baby carriage of claim 4, wherein said operating rod means is turnably connected at one end thereof to said rotary member and at the other end thereof to said handrail.

6. The foldable baby carriage of claim 4, wherein said operating rod means is turnably connected at one end thereof to said rotary member and at the other end thereof to said front leg.

7. The foldable baby carriage of claim 4, wherein said operating rod means is turnably connected at one end thereof to said rotary member and at the other end thereof to said seat support rod.

8. The foldable baby carrage of claim 4, wherein said operating rod means is turnably connected at one end thereof to said rotary member and at the other end thereof to said rear leg.

9. The foldable baby carriage of claim 1, wherein said storage means comprise a foldable storage bag having a bottom comprising at least one stiffener sheet attached to said bottom for retaining a proper shape of said storage bag.

10. The foldable baby carriage of claim 1, said foldable frame means further comprising a pair of seat support rods extending forwardly and rearwardly to support a seat, a central connecting member foldable substantially at its middle and connecting between said pair of seat support rods, a rear leg connecting member connected between a pair of rear legs and foldable at its middle, a prop rod connected between said central connecting member and said rear leg connecting member to establish operative association between a folding movement of said central connecting member and a folding movement of said rear leg connecting member, so that when said baby carriage is folded, said central connecting member and said rear leg connecting member are folded at their respective middle, whereby the right and left lateral surfaces of said baby carriage move toward each other to reduce a front to back dimension of said baby carriage, and whereby said prop rod has a bent shape with a bent portion positioned relatively forwardly of said rear leg connecting member, and said prop rod extends approximately horizontally from said bent portion to said rear leg connecting member, so that said storage means is positioned above said prop rod.

* * * * *